United States Patent
Huang et al.

(10) Patent No.: US 12,500,655 B2
(45) Date of Patent: Dec. 16, 2025

(54) TECHNIQUES FOR BEAM REFINEMENT AND BEAM SELECTION ENHANCEMENT

(71) Applicant: QUALCOMM Incorporated, San Diego, CA (US)

(72) Inventors: Yi Huang, San Jose, CA (US); Ting Kong, San Diego, CA (US); Mihir Vijay Laghate, San Diego, CA (US); Rahul Malik, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/880,439

(22) Filed: Aug. 3, 2022

(65) Prior Publication Data

US 2024/0048221 A1 Feb. 8, 2024

(51) Int. Cl.
*H04B 7/08* (2006.01)
*H04W 16/28* (2009.01)
*H04W 72/1263* (2023.01)

(52) U.S. Cl.
CPC .......... *H04B 7/0888* (2013.01); *H04W 16/28* (2013.01); *H04W 72/1263* (2013.01)

(58) Field of Classification Search
CPC ......................... H04B 7/0888; H04B 7/0404; H04B 7/06964; H04B 7/06958; H04W 16/28; H04W 72/1263
See application file for complete search history.

(56) References Cited

U.S. PATENT DOCUMENTS

| | | | |
|---|---|---|---|
| 10,945,268 B2 * | 3/2021 | Li | H04B 7/088 |
| 2018/0034531 A1 * | 2/2018 | Sadiq | H04B 7/0695 |
| 2018/0146419 A1 | 5/2018 | Raghavan et al. | |
| 2022/0140886 A1 | 5/2022 | Lau et al. | |

FOREIGN PATENT DOCUMENTS

| WO | WO-2021113122 A1 * | 6/2021 | ......... H04B 7/0452 |
|---|---|---|---|
| WO | WO-2022076118 A1 * | 4/2022 | ......... H04B 7/0404 |

OTHER PUBLICATIONS

International Search Report and Written Opinion—PCT/US2023/069092—ISA/EPO—Oct. 4, 2023 (2205150WO).
Naribole S., et al., "Scalable Multicast in Highly-Directional 60-GHz WLANs", IEEE /ACM Transactions on Networking, New York, US, Oct. 1, 2017, vol. 25, No. 5, pp. 2844-2857, XP058382009, chapter I.A, p. 2844, chapter III.A, p. 2847, chapter III.C, p. 2848.

* cited by examiner

*Primary Examiner* — Elton Williams
(74) *Attorney, Agent, or Firm* — Holland & Hart LLP

(57) ABSTRACT

Methods, systems, and devices for wireless communications are described. A first device may select a first beam and a second beam from a set of beams for communicating with a second device. The first device may perform a beam refinement procedure of the first beam to generate a first multicast autonomous beam refinement tree. The first device may determine a trigger for performing the beam refinement procedure of the second beam, and the first device may generate a second multicast autonomous beam refinement tree. The first device may communicate with the second device using the second beam.

30 Claims, 11 Drawing Sheets

TECHNIQUES FOR BEAM REFINEMENT AND BEAM SELECTION ENHANCEMENT

FIELD OF TECHNOLOGY

The following relates to wireless communications, including techniques for beam refinement and beam selection enhancement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some wireless communications systems, a device, such as a UE or customer premise equipment (CPE), may use beam refinement procedures to select a beam to use to communicate with other devices (e.g., a network entity or a base station). However, in some examples, the selected beam may be blocked by a blockage or may not be used for communications, and the device may not be to select another beam.

SUMMARY

The described techniques relate to improved methods, systems, devices, and apparatuses that support techniques for beam refinement and beam selection enhancement. Generally, the described techniques provide for a first device (e.g., a user equipment (UE) or a customer premise equipment (CPE)) to select a beam for communicating by performing an enhanced beam refinement procedure. In some examples, the first device may determine two beams (a first beam and a second beam) for communicating with a second device. The first device may then determine that the first beam associated with a first beam tree is blocked (e.g., by a blockage), and the first device may determine to perform a beam refinement procedure for the second beam. For example, the first device may identify and select two beams. The first device may use the second beam to communicate with a second device, such as a network entity.

In some examples, the first device (e.g., a UE) may identify a first beam from a first antenna panel and a second beam from a second antenna panel at the UE 115. Additionally, or alternatively, the first device (e.g., a CPE) may determine a second beam tree based on a parent beam, where the second beam is in the same panel of the CPE as the first beam. For example, the first device may determine a second beam tree based on a beam metric. The first device may perform the beam refinement procedure to generate the second beam tree (that has been identified by the first device prior to beam blockage), and the first device may use a beam at the last level of the beam tree to communicate with a second device. For example, the first device may compare the blocked beam with other beams at the same panel, and the first device may select a second beam based on the beam metric (e.g., reference signal received power (RSRP)). The first device may perform the beam refinement procedure to generate the second beam tree, and the first device may use a UE beam at the last level of the beam refinement tree to communicate with a second device. Additionally, or alternatively, if the blockage is removed or if a beam switch is triggered, the first device (e.g., the UE, the CPE, or both) may continue to identify other beams. In some examples, the first device may use the previously blocked beam (e.g., first selected beam) to communicate with the second device.

A method for wireless communication at a first device is described. The method may include selecting a first beam and a second beam from a set of multiple beams for communicating with a second device, performing a beam refinement procedure of the first beam to generate a first multicast autonomous beam refinement tree, determining a trigger for performing the beam refinement procedure of the second beam, performing the beam refinement procedure of the second beam to generate a second multicast autonomous beam refinement tree in response to determining the trigger, and communicating with the second device based on performing the beam refinement procedure of the second beam.

An apparatus for wireless communication at a first device is described. The apparatus may include a processor, memory coupled with the processor, and instructions stored in the memory. The instructions may be executable by the processor to cause the apparatus to select a first beam and a second beam from a set of multiple beams for communicating with a second device, perform a beam refinement procedure of the first beam to generate a first multicast autonomous beam refinement tree, determine a trigger for performing the beam refinement procedure of the second beam, perform the beam refinement procedure of the second beam to generate a second multicast autonomous beam refinement tree in response to determining the trigger, and communicate with the second device based on performing the beam refinement procedure of the second beam.

Another apparatus for wireless communication at a first device is described. The apparatus may include means for selecting a first beam and a second beam from a set of multiple beams for communicating with a second device, means for performing a beam refinement procedure of the first beam to generate a first multicast autonomous beam refinement tree, means for determining a trigger for performing the beam refinement procedure of the second beam, means for performing the beam refinement procedure of the second beam to generate a second multicast autonomous beam refinement tree in response to determining the trigger, and means for communicating with the second device based on performing the beam refinement procedure of the second beam.

A non-transitory computer-readable medium storing code for wireless communication at a first device is described. The code may include instructions executable by a processor to select a first beam and a second beam from a set of multiple beams for communicating with a second device, perform a beam refinement procedure of the first beam to generate a first multicast autonomous beam refinement tree, determine a trigger for performing the beam refinement procedure of the second beam, perform the beam refinement procedure of the second beam to generate a second multicast autonomous beam refinement tree in response to determining the trigger, and communicate with the second device based on performing the beam refinement procedure of the second beam.

In some examples of the method, apparatuses, and non-transitory computer-readable medium described herein, selecting a first beam and a second beam may include operations, features, means, or instructions for selecting the first beam based on a first beam metric and selecting the second beam based on a second beam metric.

In some examples of the method, apparatuses, and non-transitory computer-readable medium described herein, performing the beam refinement procedure of the second beam may include operations, features, means, or instructions for generating a beam mapping associated with the second beam based on the second multicast autonomous beam refinement tree, selecting a third beam based on the beam mapping associated with the second beam, and communicating with the second device using the third beam.

In some examples of the method, apparatuses, and non-transitory computer-readable medium described herein, the beam mapping includes a mapping of a first set of multiple beams associated with the second beam to a first level of a set of multiple levels and a mapping of a second set of multiple beams associated with the second beam to a second level of the set of multiple levels.

Some examples of the method, apparatuses, and non-transitory computer-readable medium described herein may further include operations, features, means, or instructions for selecting a beam from the first set of multiple beams and the second set of multiple beams based on a beam metric.

In some examples of the method, apparatuses, and non-transitory computer-readable medium described herein, selecting the third beam may include operations, features, means, or instructions for selecting the third beam from a subset of beams corresponding to a level of a set of multiple levels.

Some examples of the method, apparatuses, and non-transitory computer-readable medium described herein may further include operations, features, means, or instructions for determining a trigger for performing a beam switch procedure and performing the beam switch procedure to select the first beam in response to determining the trigger for performing the beam switch procedure, where the first beam may be selected based on the first beam satisfying a hysteresis threshold.

In some examples of the method, apparatuses, and non-transitory computer-readable medium described herein, the first beam and the second beam include pseudo-omnidirectional beams or narrow beams or a combination thereof.

In some examples of the method, apparatuses, and non-transitory computer-readable medium described herein, determining the trigger for performing the beam refinement procedure may include operations, features, means, or instructions for determining a blockage of the first beam at the first device, where the blockage may be associated with a degradation of a wireless communication performance of the first beam at the first device.

In some examples of the method, apparatuses, and non-transitory computer-readable medium described herein, the first device includes a UE, the first beam may be located on a first wireless panel at the UE, and the second beam may be located on a second wireless panel at the UE.

In some examples of the method, apparatuses, and non-transitory computer-readable medium described herein, the first device includes a CPE, the first beam may be located on a first wireless panel at the CPE, and the second beam may be located on a second wireless panel at the CPE.

In some examples of the method, apparatuses, and non-transitory computer-readable medium described herein, the first device may be a CPE, and the first beam and the second beam may be associated with a same panel at the CPE.

DETAILED DESCRIPTION

Figure 1:
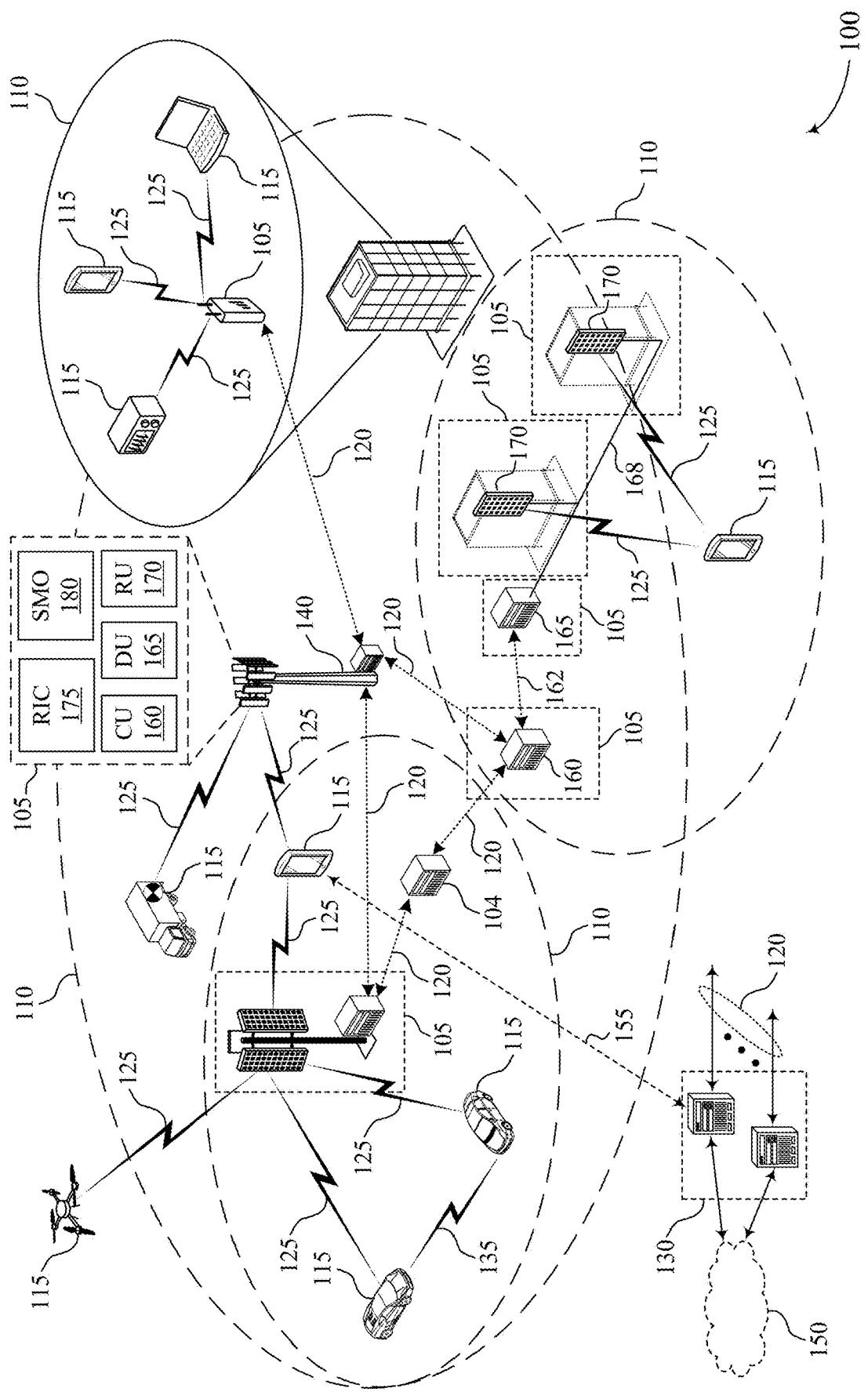
FIG. 1 illustrates an example of a wireless communications system that supports techniques for beam refinement and beam selection enhancement in accordance with one or more aspects of the present disclosure.

Some devices, such as a client premise equipment (CPE), a user equipment (UE), or both, may perform beam refinement procedures to communicate with other devices. For example, a device may identify a beam refinement mapping (e.g., a beam tree), and the beam tree may be based on a pseudo-omnidirectional (e.g., parent) beam associated with a set of beams (e.g., child beams). The device may measure the parent beam and the child beams based on a beam metric, and the device may refine the beam tree at multiples levels based on the beam metric. The device may select a beam at a level (e.g., a highest level) of the beam tree, and the device may communicate with another device using the selected beam. In some examples, a UE may have multiple antenna panels (e.g., four panels) with multiple beams, and a CPE may have a single antenna panel with multiple beams. However, in some examples, a trigger for beam switch (e.g., an object blocking a beam) may degrade the performance of a selected parent beam, and the UE or CPE may select another beam to avoid the blockage. However, the UE or the CPE may not be able to select another beam because the UE or CPE may be constricted to selecting beams adjacent to the blocked parent beam. As a result, the CPE or UE may not be able to select a second beam (e.g., a beam with relatively high beam metric) because the second beam may not be adjacent to the blocked parent beam, which may result in inefficient communications and decreased throughput.

In order to allow the first device (e.g., a UE or a CPE) to select a second beam, a first device may perform an enhanced beam refinement procedure. For example, the first device may preselect two beams. If a first beam is blocked, the first device may use the second beam to communicate with a second device, such as a network entity. In some examples, the first device (e.g., a UE) may identify a first beam from a first antenna panel and a second beam from a second antenna panel at the UE. For example, the first device may determine a second beam tree based on a beam metric. When a first beam is blocked, the first device may perform the beam refinement procedure to generate the second beam tree (that has been identified by the first device prior to beam blockage), and the first device may use a beam at the last level of the beam tree to communicate with a second device. Additionally, or alternatively, the first device (e.g., a CPE) may determine a second beam tree based on a parent beam, where the second beam is in the same panel of the CPE as the first beam. For example, the first device may compare the blocked beam with other beams at the same panel, and the first device may select a second beam based on the beam metric (e.g., reference signal received power (RSRP)). The first device may perform the beam refinement procedure to generate the second beam tree, and the first device may use the beam at the last level of the beam refinement tree to communicate with a second device. Additionally, or alternatively, if the blockage is removed or if there is another trigger for beam switch, the first device (e.g., the UE, the CPE, or both) may continue to identify other beams. In some examples, the first device may use the previously blocked beam (e.g., first selected beam) to communicate with a second device.

The described techniques may allow for the first device to efficiently select a beam for communication, which may result in decreased latency and more efficient communication between devices. Additionally, the described techniques may allow for the first device to avoid a blockage in communication, which may result in increased efficiency at the first device and increased throughput at the first device.

Aspects of the disclosure are initially described in the context of wireless communications systems. Aspects of the disclosure are further described and illustrated by a beam tree mapping scheme, a beam tree generation scheme, and a process flow. Aspects of the disclosure are further illustrated by and described with reference to apparatus diagrams, system diagrams, and flowcharts that relate to techniques for beam refinement and beam selection enhancement.

FIG. 1 illustrates an example of a wireless communications system 100 that supports techniques for beam refinement and beam selection enhancement in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for beam refinement and beam selection enhancement as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Wireless communications system 100 may implement a beam refinement procedure for a first device to communicate with a second device. In some examples, the first device may be a CPE, a UE 115, or both. The CPE, the UE 115, or both may be associated with multiple antenna panels or a single antenna panel for communications. The CPE may include a wireless technology terminal (e.g., a telephone handset, a cable television box, a Digital Subscriber Line (DSL) routers, etc.), and the CPE may be associated with IoT gateway technology. For example, the CPE may receive a wireless signal (e.g., an LTE signal, a 5G signal, etc.) from a network entity 105, and the CPE may provide wireless connectivity (e.g., LTE connectivity, 5G connectivity, etc.) for other IoT devices (e.g., a cell phone, a tablet, etc.) by converting the received signal into a short range wireless signal. In some examples, the first device (e.g., a UE 115, a CPE, or both) may perform beam refinement procedures to communicate with a second device (e.g., a UE 115, a CPE, a network entity 105, etc.). For example, the first device may perform an initial access procedure, such as beam sweeping, to acquire beam synchronization in communication with the second device. The CPE may perform beamforming and beam refinement based on a codebook, where the codebook may be a precoded matrix for beam synchronization values at an antenna panel.

The first device may perform beam-sweeping by selecting multiple beams at the first device for communications. The multiple beams may be dynamic beams, static beams, or both. Dynamic beams may include beams that the first device may position with beam steering, and static beams may be preconfigured in position at the first device. In some examples, the multiple beams may be pseudo-omnidirectional beams (e.g., layer one (L1) beams, parent beams, etc.) or narrower beams (e.g., narrow beams, layer two (L2) beams, parent beams, etc.). The parent beams may be associated with a set of beams (e.g., layer three (L3) beams, child beams, etc.). For example, the L3 beams (e.g., child beams) may be adjacent beams (e.g., beams that are adjacent to the parent beam), or static beams that are associated with the parent beam. The first device may measure (e.g., may be scheduled by a network entity 105 to measure) each of the beams by measuring a beam metric (e.g., reference signal received power (RSRP)). The RSRP may be a measurement of the received power level in the wireless network.

The first device may perform the beam refinement procedure to generate a beam tree (e.g., a multicast autonomous beam refinement tree) of the selected parent beam and the associated child beams. For example, the beam tree may be based on the parent beam, and the first device may use a UE beam to multicast (e.g., broadcast to multiple devices) beam information autonomously (e.g., by selection of the first device). The beam tree may be organized in multiple levels, where the first level may include the parent beam, the second level may include a subset of the set of child beams, the third level may include a subset of the set of child beams, and the fourth level may include a subset of the set of child beams. The first device may use the beam tree by selecting a child beam at each level of the beam tree. In some examples, the first device may select the child beam based on the beam metric (e.g., RSRP) for each beam included in the level. The first device may use the selected L3 beam (e.g., selected UE beam) at the fourth level to communicate with the second device.

However, the first device may determine to perform a beam switch procedure (e.g., the first device may switch from a first parent beam to another parent beam). In some examples, the performance of the selected parent beam at the first device may be degraded by a blockage (e.g., an object blocking the selected parent beam), and the first device may perform the beam switch procedure to avoid the blockage. In this case, the first device may be a UE 115, and the UE 115 may have multiple antenna panels. The UE 115 may select another parent beam at another antenna panel that may not be affected by the blockage. However, the selected parent beam at the other antenna panel may not be associated with a beam metric (e.g., the UE 115 may not have measured the selected parent beam) because the UE 115 may be constricted to measuring adjacent beams at the same antenna panel, the UE 115 may not be aware of (e.g., may not have determined) the beam tree of the other panel, or both. Therefore, the selected pseudo-omnidirectional beam at the other antenna panel may not satisfy a threshold metric (e.g., in comparison to other pseudo-omnidirectional beams at the other antenna panel) for communication, which may result in inefficient communications and decreased throughput.

Additionally, or alternatively, the first device may be a CPE, and the CPE may be associated with a single antenna panel. In some examples, the CPE may be located on a pole, a roof top, a window, a wall, a table, and a moving object (e.g., a truck, people, etc.) may be blocking a parent beam (e.g., the strongest cluster of beams). The CPE may determine to perform a beam switch procedure based on a blockage, and the CPE may select another parent beam on the same antenna panel. The CPE may perform the beam switch procedure and select another parent beam at the antenna panel. However, the CPE may not be able to completely avoid the blockage and select another beam at another antenna panel (e.g., like the UE 115) because the CPE may have a single panel. In some examples, the CPE may not be able to use the first selected beam once the blockage is no longer degrading the performance of the selected beam. Additionally, or alternatively, the CPE may be associated with a large codebook of beam synchronization values, which may result in the beam trees of the multiple beams at the single antenna panel to be isolated (e.g., the beams may not be mapped in the same beam tree). Additionally, or alternatively, the beams may not be adjacent beams to the selected parent beams, and the CPE may not be able to select the beams based on the beam refinement procedure. The CPE may not be able to compare beams across levels for multiple beam trees (e.g., cross level comparison may be unfair and challenging for the CPE). The CPE being unable to select a beam satisfying a beam metric threshold, may result in increased latency and inefficient communications with a second device.

In order to allow the first device (e.g., a UE 115 or a CPE) to preselect a second beam, a first device may perform an enhanced beam refinement procedure. For example, the first device may preselect two beams. If a first beam is blocked, the first device may use the second beam to communicate with a second device, such as a network entity 105. In some examples, the first device (e.g., a UE 115) may identify a first beam from a first antenna panel and a second beam from a second antenna panel at the UE 115. For example, the first device may determine a second beam tree based on a beam metric. When a first beam is blocked, the first device may perform the beam refinement procedure to generate the second beam tree (that has been identified by the first device prior to beam blockage), and the first device may use a beam at the last level of the beam tree to communicate with a second device. Additionally, or alternatively, the first device (e.g., a CPE) may determine a second beam tree based on a parent beam, where the second beam is in the same panel of the CPE as the first beam. For example, the first device may compare the blocked beam with other beams at the same panel, and the first device may select a second beam based on the beam metric (e.g., RSRP). The first device may perform the beam refinement procedure to generate the second beam tree, and the first device may use the beam at the last level of the beam refinement tree to communicate with a second device. In this example, the beam-level serving UE beam (e.g., the first selected beam) may allow for the first device to select a second beam. Additionally, or alternatively, if the blockage is removed, the first device (e.g., the UE, the CPE, or both) may continue to identify other beams, the first device may use the previously blocked beam (e.g., first selected beam) to communicate with a second device. The first device preselecting a beam may allow for improved probability of convergence (e.g., cellular and short-range connection) between devices, a relatively higher average RSRP of the multiple beams, and lessened variation of RSRP among the multiple beams.

Figure 2:
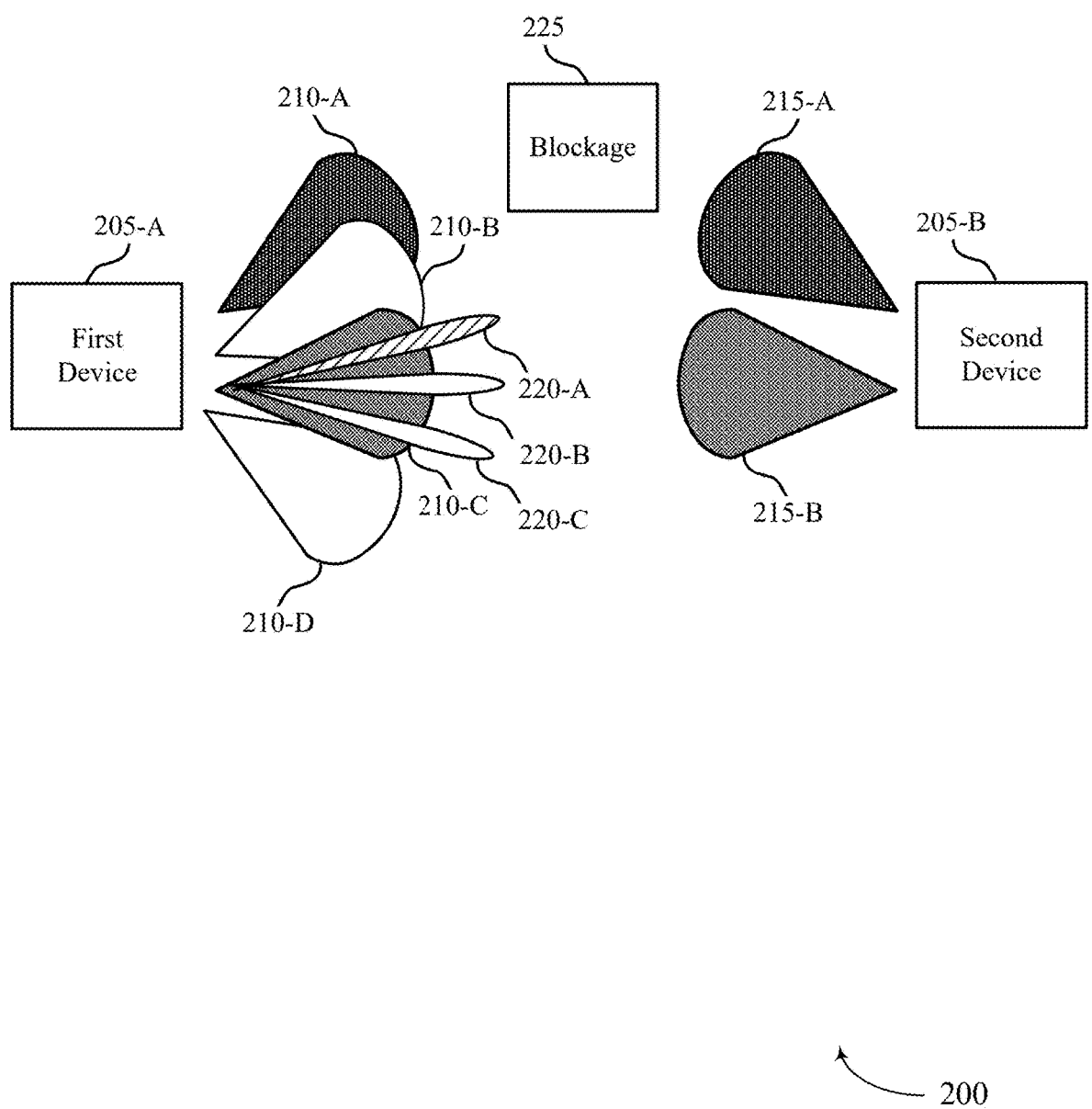
FIG. 2 illustrates an example of a wireless communications system that supports techniques for beam refinement and beam selection enhancement in accordance with one or more aspects of the present disclosure.

FIG. 2 illustrates an example of a wireless communications system 200 that supports techniques for beam refinement and beam selection enhancement in accordance with one or more aspects of the present disclosure. In some examples, wireless communications system 200 may implement aspects of wireless communications system 100. For example, wireless communications system 200 may support communications between a first device 205-a and a second device 205-b which may be examples of corresponding first device and second device as described with reference to FIG. 1. In some examples, a first device 205-a may communicate with a second device 205-b using a beam.

The first device 205-a may select a beam to perform a beam refinement procedure and to communicate with the second device 205-b. For example, the first device 205-a may select beam 210-a based on a beam metric (e.g., a relatively high RSRP) to communicate with the second device 205-b via corresponding beam 215-a. However, in some examples, the first device 205 may determine a trigger to perform a beam switch (e.g., to perform a beam refinement procedure of another beam 210). For example, a blockage 225 may degrade the performance of beam 210-a, and the first device 205-a may determine to perform a beam switch procedure by selecting another beam 210. In some examples, the blockage 225 may be included in a trigger for beam switch. The first device 205-a may select the other beam 210 based on a beam metric (e.g., a relatively high RSRP). However, in some examples, the first device 205-a may not be able to select the second beam (e.g., the second beam with a second highest RSRP) because the second beam may not be adjacent to the first selected beam 210-a (e.g., the beam switch procedure may fail if an adjacent intermediate beam has a relatively lesser RSRP). For example, the blockage 225 may block beam 210-a, and beam 210-c may be the next strongest (e.g., second) beam. The first device 205-a may be unable to select beam 210-c because beam 210-c is not adjacent to beam 210-a. Additionally, or alternatively, the two beams may not be mapped on a beam tree determined by the first device 205-a.

In order to allow the first device 205-a to preselect a second beam, a first device 205-a may perform an enhanced beam refinement procedure. For example, the first device 205-a may preselect two beams (e.g., beam 210-a and beam 210-c). The first device 205-a may select beam 210-c based on determining a trigger for performing the beam switch procedure (e.g., if beam 210-a is blocked by blockage 225). The first device 205-a may perform the beam switch procedure and select beam 210-c (e.g., UE beam) to communicate with a second device 205-b via beam 215-b. The first device 205-a may select the beam 210-c based on the beam 210-c satisfying a threshold beam metric.

The first device 205-a may perform a beam refinement procedure for communications by using a second beam tree associated with multiple beams 220. The first device 205-a may use a beam at a last level of the beam tree (e.g., beam 220-a) to communicate with the second device 205-b. In some examples, the first device 205-b may compare each beam 220 with other beams 220 (e.g., beam 220-b and beam 220-c) at the same level, and the first device may select the beam 220 at each level based on the beam metric (e.g., RSRP). For example, a UE 115 may select a second beam from another antenna panel at the UE 115. In another example, a CPE may select the second beam from the same antenna panel at the CPE.

Additionally, or alternatively, if the blockage is removed, the first device (e.g., the UE, the CPE, or both) may continue to identify other beams, the first device may use the previously blocked beam (e.g., first selected beam) to communicate with a second device, which may increase the RSRP of the multiple beams. In some examples, the first device 205-a may perform the beam switch procedure and select beam 210-a (e.g., previously blocked beam) to communicate with a second device 205-b based on the beam 210-a satisfying a hysteresis threshold. In some examples, the hysteresis offset may be 2 db. For example, the first device 205-a may determine to perform the beam switch procedure if the RSRP of beam 210-a is greater than the RSRP of beam 210-c by a threshold (e.g., RSRP of beam 210-a–2 dB<hysteresis threshold).

Figure 3:
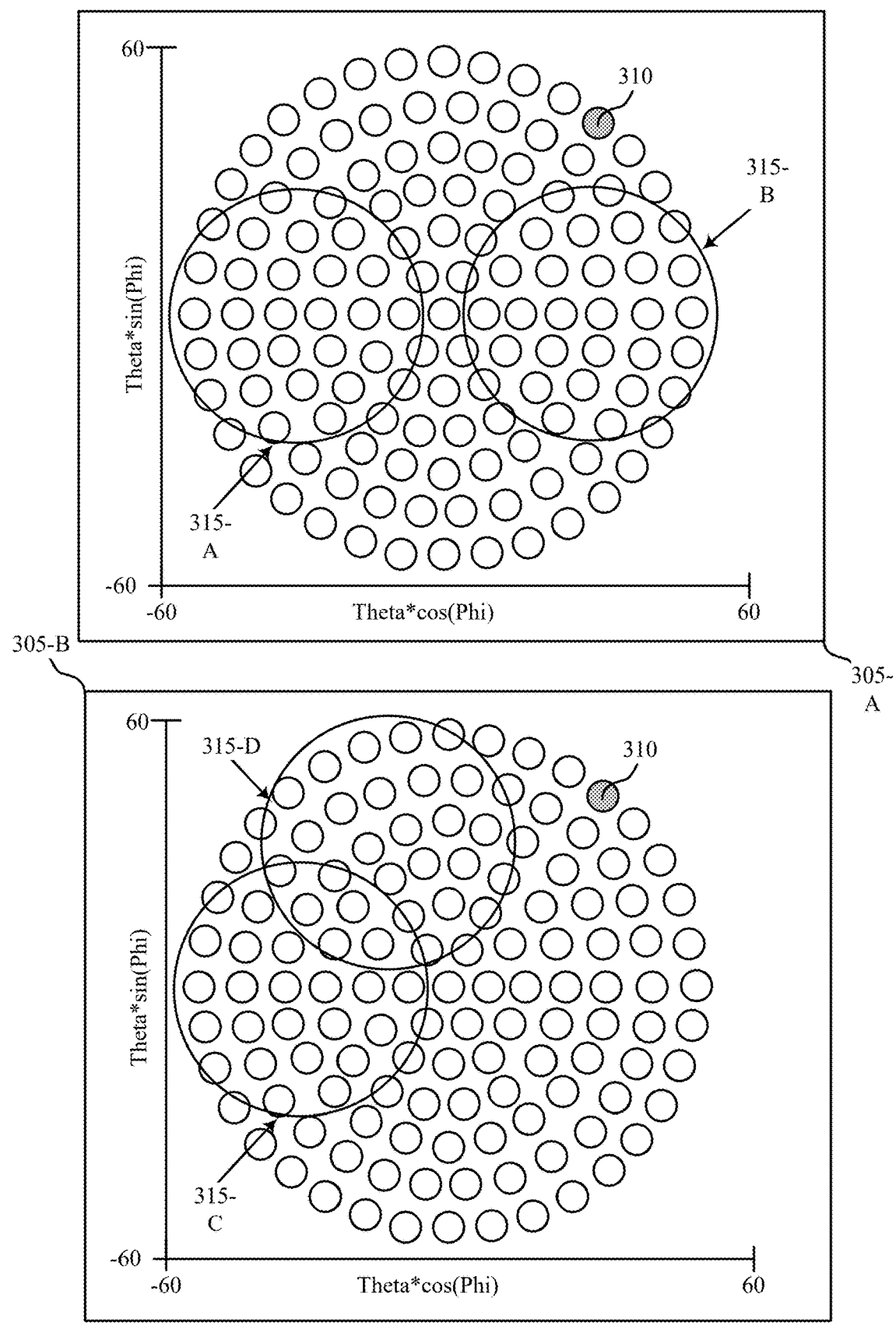
FIG. 3 illustrates an example of beam tree mapping schemes that supports techniques for beam refinement and beam selection enhancement in accordance with one or more aspects of the present disclosure.

FIG. 3 illustrates an example of beam tree mapping schemes 300 that supports techniques for beam refinement and beam selection enhancement in accordance with one or more aspects of the present disclosure. In some examples, beam tree mapping scheme 300 may implement aspects of wireless communications system 100 and wireless communications system 200. For example, beam tree mapping scheme 300 may include beam trees for communications between a first device 205 and a second device 205, which may be examples of corresponding beam trees, a first device, and a second device, as described with reference to FIGS. 1 and 2. In some examples, a first device 205 may communicate with a second device 205 using a beam 310.

As described with reference to FIG. 2, a first device 205 may generate a beam tree (e.g., a multicast autonomous beam refinement tree) based on a mapping of multiple beams associated with a selected parent beam to perform a beam switch procedure (e.g., in the case of the blockage of a selected beam). For example, with reference to beam tree mapping 305-a, the first device 205 may select a beam 310 within a beam tree area 315-a of the mapping of multiple beams 310. Based on the beam tree area 315-a, the first device 205 may generate the beam tree of multiple beams surrounding the selected beam 310. In this example, beam tree 315-a and beam tree 315-b may be separated from each other (e.g., isolated). For example, a CPE may be associated with a large codebook correlating to a large mapping of multiple beams, which may result in the CPE, or a first device 205, being unable to select a beam from the other beam tree (e.g., from beam tree area 315-b).

Additionally, or alternatively, with reference to beam tree mapping 305-b, the first device 205 may select a beam 310 within a beam tree area 315-c of the mapping of multiple beams 310. Based on the beam tree area 315-c, the first device 205 may generate the beam tree of multiple beams surrounding (or adjacent to) the selected beam 310. In this example, beam tree area 315-c and beam tree area 315-d may overlap with each other. However, the first device 205 may not be able to select the beam with the second highest RSRP from beam tree area 315-d as part of a beam switch procedure because the selected beam 310 from beam tree area 315-c may not be adjacent to a selected beam from beam tree area 315-d, may not share a parent beam 310 with the selected beam, or both (e.g., beams with high RSRP may not be related by adjacent/parent beams due to a narrow beam level).

In order to select a beam from another beam tree, the first device 205 may perform an enhanced beam refinement procedure, as described with reference to FIG. 2. The first device 205 may compare beams across beam tree levels for the beam switch procedure by using a parent beam (e.g., a higher beam-level serving UE beam) to switch to another parent beam associated with another beam tree. The first device 205 may select another parent beam 310, and the first device 205 may generate a beam tree for the beam refinement procedure of the parent beam 310. The first device 205 may generate a mapping of the selected child beams of the parent beam 310 by selecting a beam at each level of the multiple levels (e.g., four levels) of the beam tree until the last level. The first device 205 may select a child beam at the last level, and the first device 205 may use the child beam to communicate with a second device 205.

Figure 4:
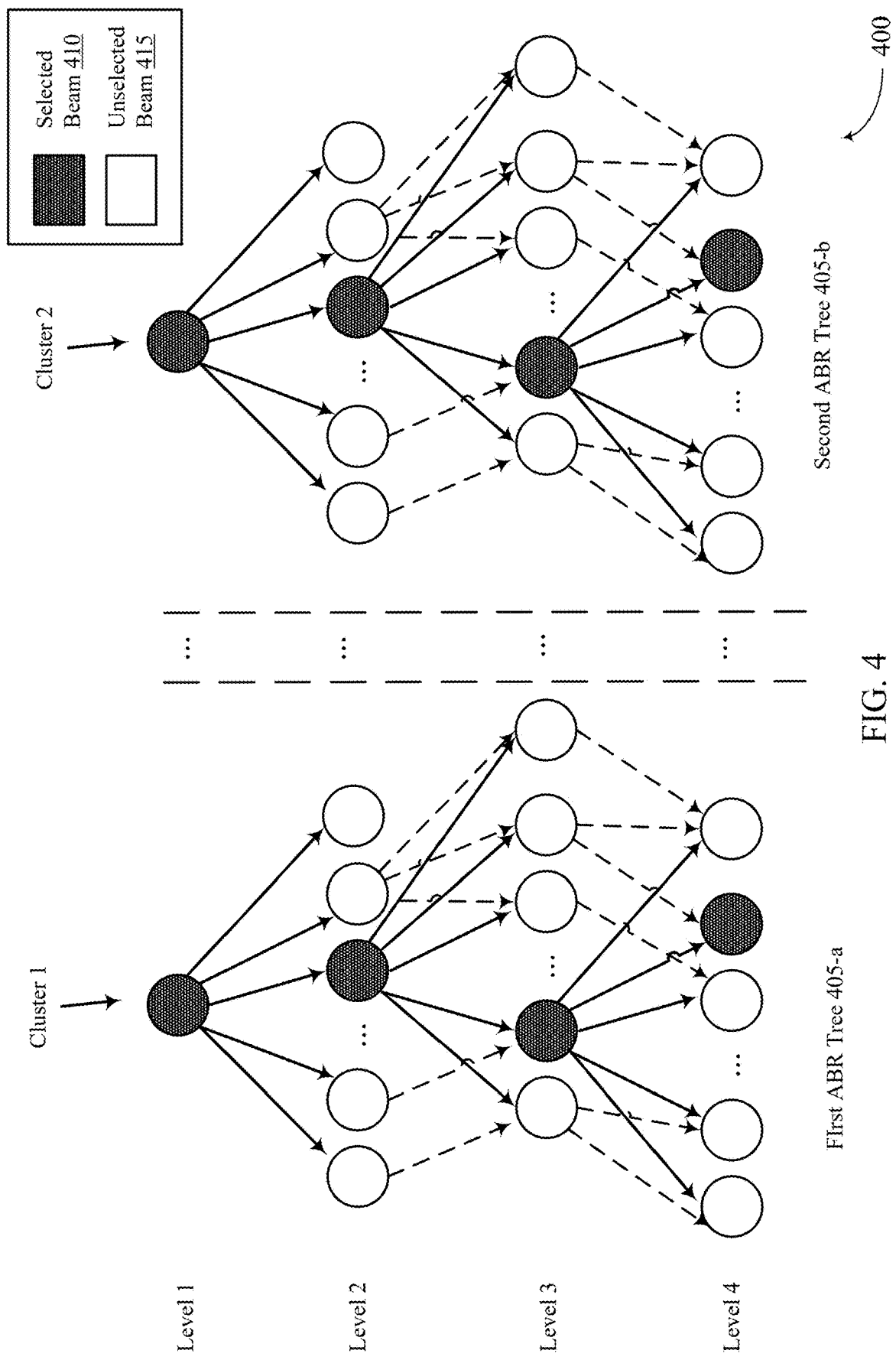
FIG. 4 illustrates an example of a beam tree generation scheme that supports techniques for beam refinement and beam selection enhancement in accordance with one or more aspects of the present disclosure.

FIG. 4 illustrates an example of a beam tree generation scheme 400 that supports techniques for beam refinement and beam selection enhancement in accordance with one or more aspects of the present disclosure. In some examples, beam tree generation scheme 400 may implement aspects of wireless communications system 100, wireless communications system 200, and beam tree mapping scheme 300. For example, beam tree generation scheme 400 may include beam trees for communications between a first device 205 and a second device 205, which may be examples of corresponding beam trees, a first device, and a second device, as described with reference to FIGS. 1 through 3. In some examples, a first device 205 may communicate with a second device 205 using a beam.

For example, as described with reference to FIGS. 2 and 3, a first device 205 may generate a beam tree 405 based on a mapping of multiple beams (e.g., a cluster of beams) associated with a selected parent beam to perform a beam switch procedure. For example, with reference to the first autonomous beam refinement tree 405-a, the first device 205 may select a beam 410 (e.g., a parent beam) of a cluster (e.g., cluster 1), and the first device 205 may generate the beam tree 405-a based on the selected parent beam 410 at level 1. The first device 205 may select a beam at each of level 2, level 3, and level 4 of the beam tree 405-a, based on RSRP. The first device 205 may not select beams 415 with a relatively lower RSRP than the selected beam 410 at each level. The first device 205 may use the selected beam 410 at level 4 to communicate with a second device 205. However, in some examples, the first device 205 may determine a trigger (e.g., a blockage of the parent beam) to perform a beam switch procedure. The first device 205 may select another beam from another cluster (e.g., cluster 2) based on RSRP.

In some examples, cluster 2 may be located in another antenna panel (e.g., for a UE 115 or a multi-panel CPE), and in other examples, cluster 2 may be located in the same antenna panel (e.g., for a CPE). The first device 205 may generate a second autonomous beam refinement tree 405-b based on the selected parent beam 410 from cluster 2 at level 1 of the beam tree 405-b. The first device 205 may select a beam at level 2, level 3, and level 4 of the beam tree 405-b based on RSRP. The first device 205 may use the selected beam 410 at level 4 to communicate with a second device 205.

Figure 5:
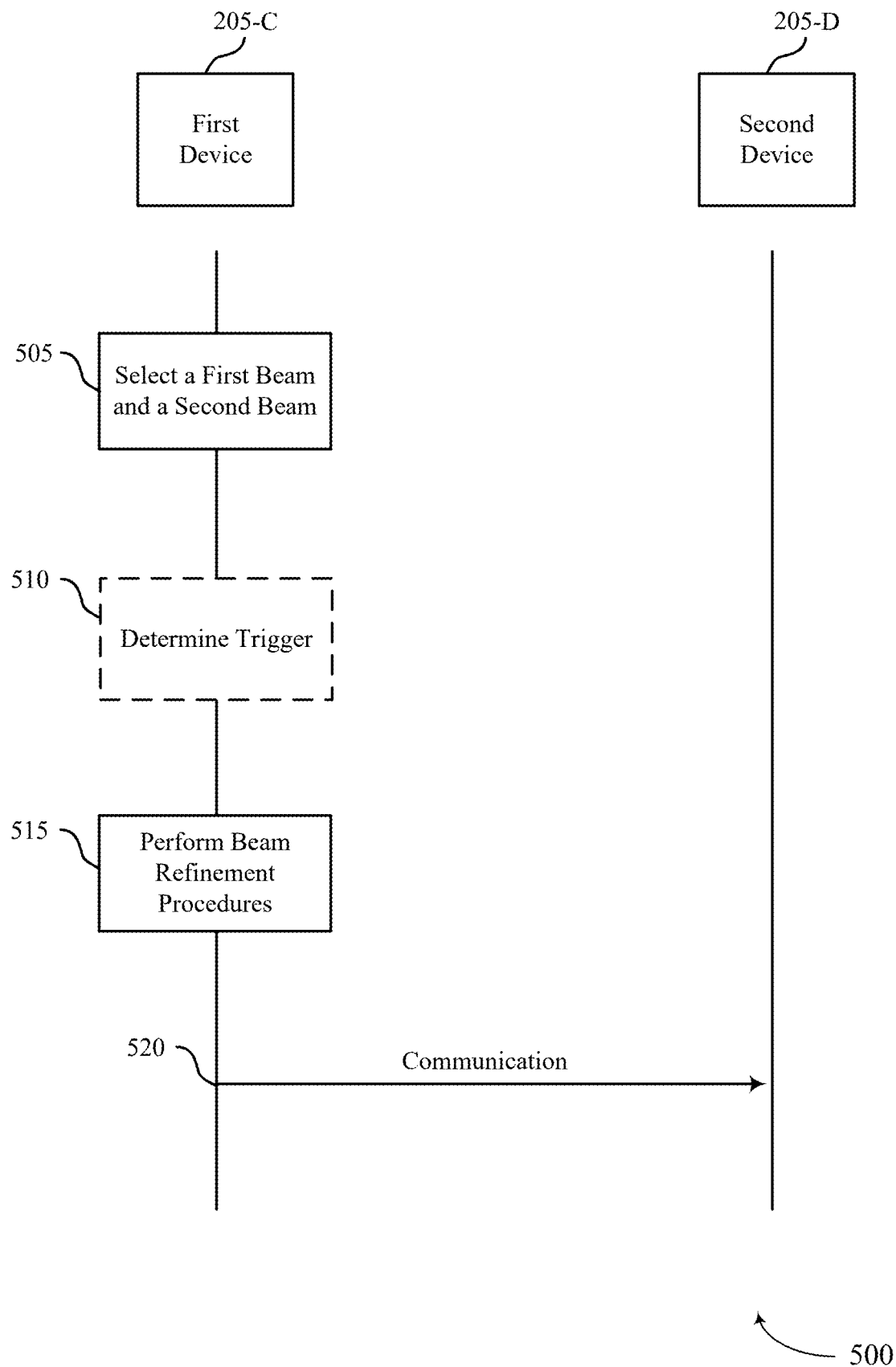
FIG. 5 illustrates an example of a process flow that supports techniques for beam refinement and beam selection enhancement in accordance with one or more aspects of the present disclosure.

FIG. 5 illustrates an example of a process flow 500 that supports techniques for beam refinement and beam selection enhancement in accordance with one or more aspects of the present disclosure. In some examples, process flow 500 may implement aspects of wireless communications systems 100, wireless communications system 200, beam tree mapping 300, and beam tree generation scheme 400. The process flow 500 may illustrate an example of a first device 205-c performing a beam refinement and beam selection procedure to communicate with a second device 205-d, which may be examples of a first device 205-a and a second device 205-b as described with reference to FIGS. 1 through 4. Alternative examples of the following may be implemented, where some processes are performed in a different order than described or are not performed. In some cases, processes may include additional features not mentioned below, or further processes may be added.

At 505, a first device 205-c may select a first beam and a second beam from multiple beams for communicating with a second device 205-d. In some examples, the first device 205-c may be a UE (e.g., a UE 115). The first beam may be located on a first wireless panel at the UE, and the second beam may be located on a second wireless panel at the UE. In some examples, the first device 205-c may be a CPE. The first beam may be located on a first wireless panel at the CPE, and the second beam may be located on a second wireless panel at the CPE. In some examples, the first device 205-c may be a CPE, and the first beam and the second beam may be associated with a same panel at the CPE. The first beam and the second beam may include pseudo-omnidirectional beams, narrow beams, or both. In some examples, the first device 205-c may select the first beam based on a first beam metric, and the first device 205-d may select the second beam based on a second beam metric.

At 510, in some examples, the first device 205-c may determine a trigger for performing a beam refinement procedure of the second beam at the first device 205-c. In some examples, the first device 205-c may determine a blockage of the first beam at the first device 205-c. The blockage may be associated with a degradation of a wireless communication performance of the first beam at the first device 205-c. In some examples, the first device may determine a trigger for performing a beam switch procedure.

At 515, the first device 205-c may perform a beam refinement procedure of the first beam to generate a first multicast autonomous beam refinement tree. The first device 205-c may perform a beam refinement of the second beam to generate a second multicast autonomous beam refinement tree in response to determining the trigger. In some examples, the first device 205-c may perform the beam switch procedure, and the first device 205-c may select the firm beam based on the first beam satisfying a hysteresis. In some examples, the first device 205-c may generate a beam mapping associated with the second beam based on the second multicast autonomous beam refinement tree. The beam mapping may include a mapping of a first set of beams associated with the second beam to a first level of multiple levels and a mapping of a second set of beams associates with the second beam to a second level of the multiple levels. In some examples, the first device 205-c may select a beam from the first set of beams and the second set of beams based on a beam metric. The first device 205-c may select a third beam based on the beam mapping associated with the second beam. In some examples, the first device 205-c may select the third beam from a subset of beams corresponding to a level of multiple levels.

At 520, the first device 205-c may communicate with the second device 205-d based on performing the beam refinement procedure of the second beam. In some examples, the first device 205-c may communicate with the second device using the third beam (e.g., a beam of the parent second beam).

Figure 6:
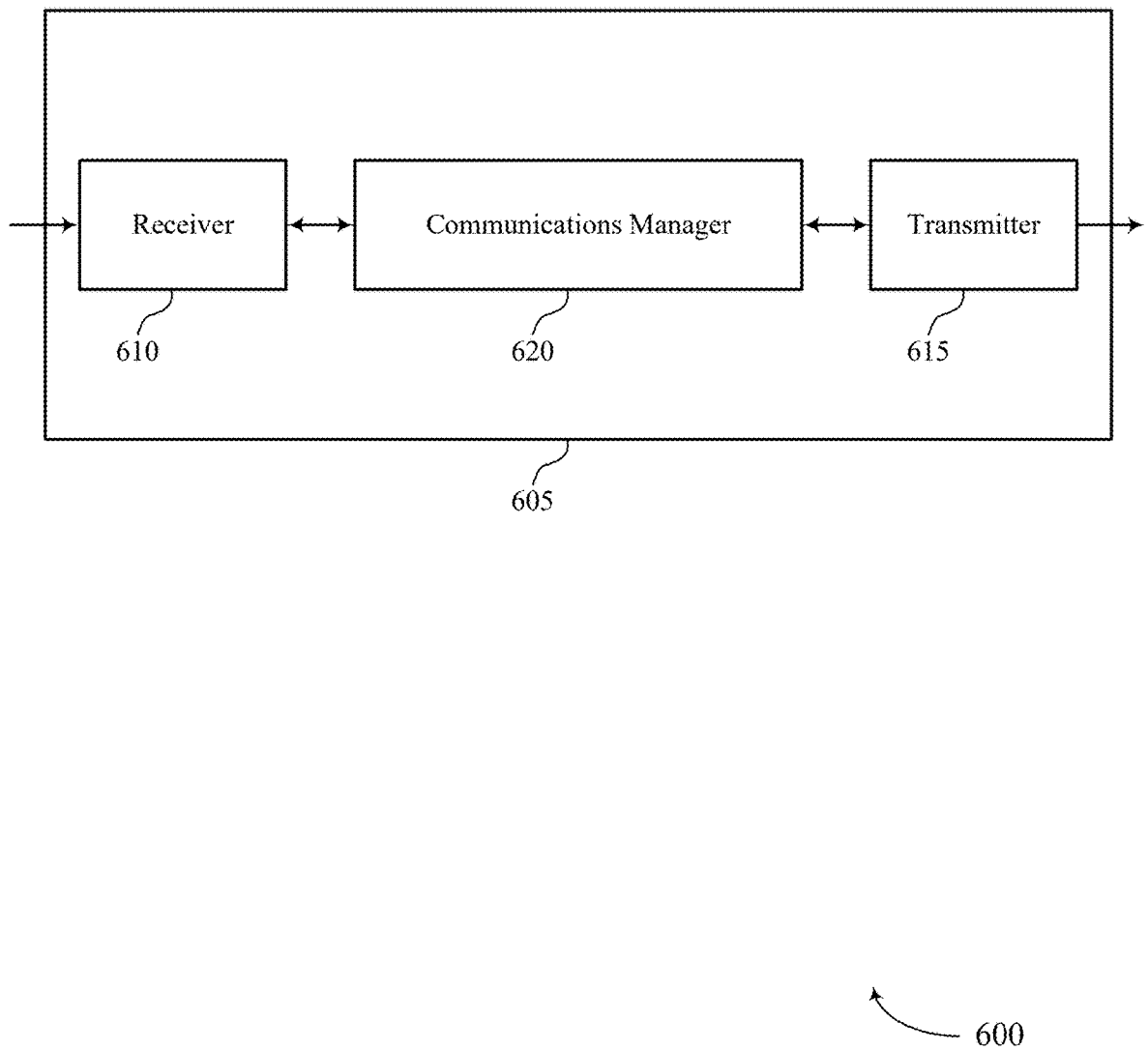
FIGS. 6 and 7 show block diagrams of devices that support techniques for beam refinement and beam selection enhancement in accordance with one or more aspects of the present disclosure.

FIG. 6 shows a block diagram 600 of a device 605 that supports techniques for beam refinement and beam selection enhancement in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for beam refinement and beam selection enhancement). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for beam refinement and beam selection enhancement). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for beam refinement and beam selection enhancement as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first device in accordance with examples as disclosed herein. For example, the communications manager 620 may be configured as or otherwise support a means for selecting a first beam and a second beam from a set of multiple beams for communicating with a second device. The communications manager 620 may be configured as or otherwise support a means for performing a beam refinement procedure of the first beam to generate a first multicast autonomous beam refinement tree. The communications manager 620 may be configured as or otherwise support a means for determining a trigger for performing the beam refinement procedure of the second beam. The communications manager 620 may be configured as or otherwise support a means for performing the beam refinement procedure of the second beam to generate a second multicast autonomous beam refinement tree in response to determining the trigger. The communications manager 620 may be configured as or otherwise support a means for communicating with the second device based on performing the beam refinement procedure of the second beam.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced power consumption and more efficient utilization of communication resources.

Figure 7:
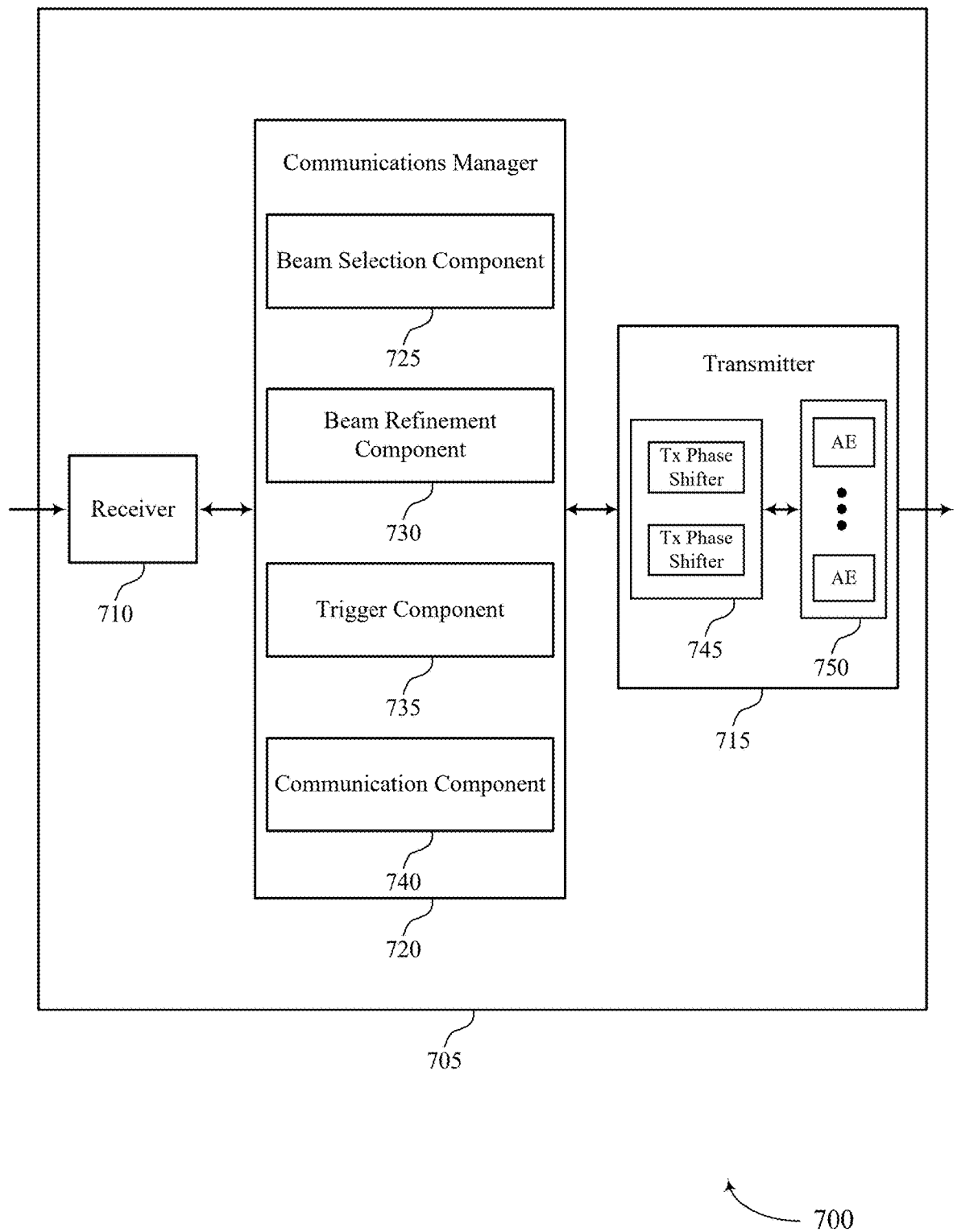

FIG. 7 shows a block diagram 700 of a device 705 that supports techniques for beam refinement and beam selection enhancement in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for beam refinement and beam selection enhancement). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for beam refinement and beam selection enhancement). In some examples, the transmitter 715 may be co-located with a receiver 710 in a transceiver module. The transmitter 715 may utilize a single antenna or a set of multiple antennas. The transmitter 715 may include one or more phase shifters 745 and one or more antenna elements 750. The transmitter 715 may utilize a single antenna or a set of multiple antennas.

A phase shifter 745 may provide a configurable phase shift or phase offset to a corresponding radio frequency signal to be transmitted on a respective antenna element 750. The settings of each of the phase shifters 745 may be independent, meaning that each can be set to provide a desired amount of phase shift or the same amount of phase shift or some other configuration. A modem or other processor may have at least one control line connected to each of the phase shifters 745 and which may be used to configure the phase shifters 745 to provide a desired amounts of phase shift or phase offset between antenna elements 750.

In at least one embodiment, changing or receiving a transmit or receive beam comprises adjusting relative phase shifts for signals on different antenna elements 850. The relative phase shifts may be achieved by the modem adjusting the phase shift of the one or more phase shifters 845. The set of phases for different phase shifters 845 (and corresponding antenna elements 850) may comprise the spatial receive parameters or spatial transmit parameters for a respective beam. To receive or transmit on a beam, the spatial parameters may need to be set before the beginning of the transmitting or receiving.

The device 705, or various components thereof, may be an example of means for performing various aspects of techniques for beam refinement and beam selection enhancement as described herein. For example, the communications manager 720 may include a beam selection component 725, a beam refinement component 730, a trigger component 735, a communication component 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first device in accordance with examples as disclosed herein. The beam selection component 725 may be configured as or otherwise support a means for selecting a first beam and a second beam from a set of multiple beams for communicating with a second device. The beam refinement component 730 may be configured as or otherwise support a means for performing a beam refinement procedure of the first beam to generate a first multicast autonomous beam refinement tree. The trigger component 735 may be configured as or otherwise support a means for determining a trigger for performing the beam refinement procedure of the second beam. The beam refinement component 730 may be configured as or otherwise support a means for performing the beam refinement procedure of the second beam to generate a second multicast autonomous beam refinement tree in response to determining the trigger. The communication component 740 may be configured as or otherwise support a means for communicating with the second device based on performing the beam refinement procedure of the second beam.

Figure 8:
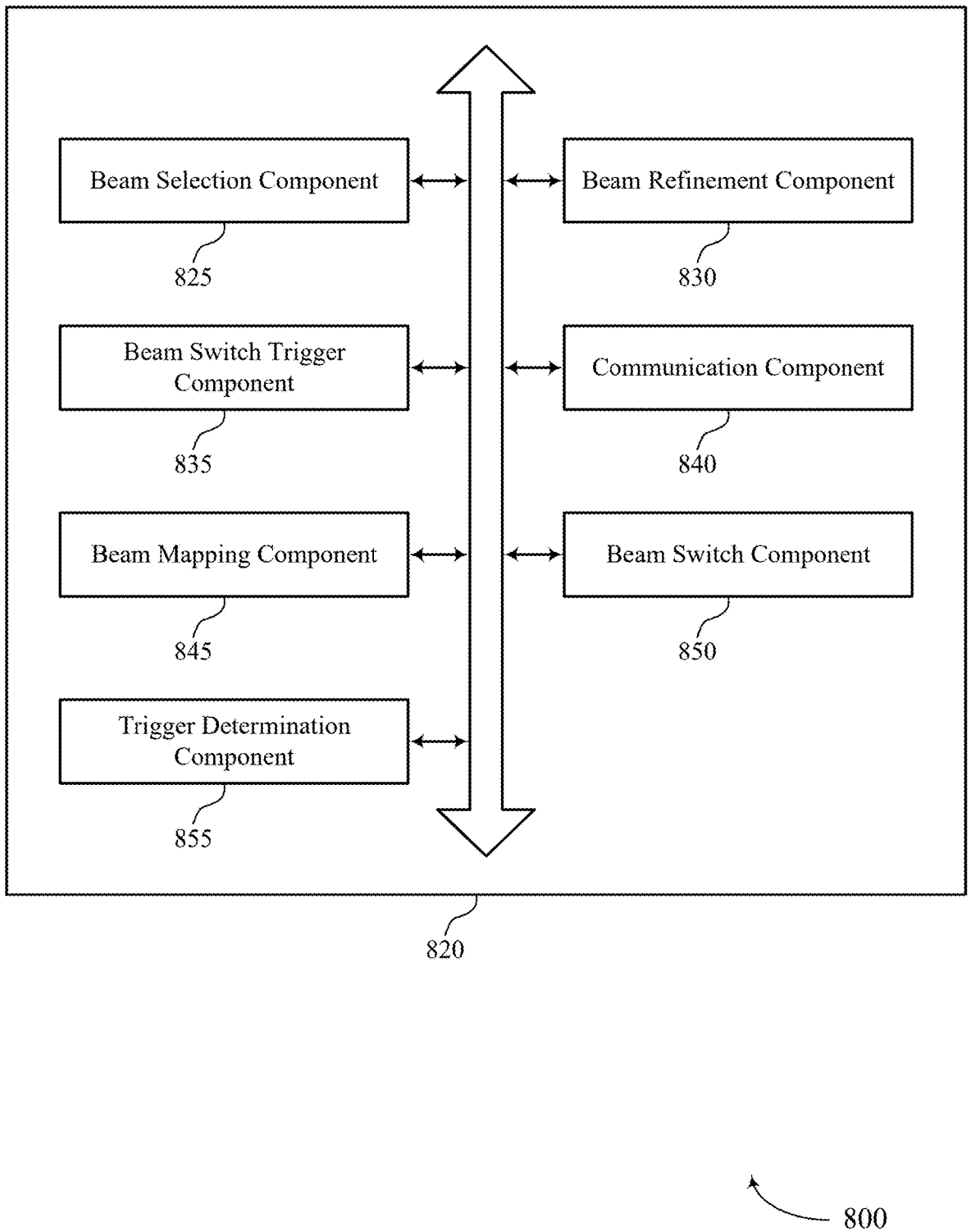
FIG. 8 shows a block diagram of a communications manager that supports techniques for beam refinement and beam selection enhancement in accordance with one or more aspects of the present disclosure.

FIG. 8 shows a block diagram 800 of a communications manager 820 that supports techniques for beam refinement and beam selection enhancement in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for beam refinement and beam selection enhancement as described herein. For example, the communications manager 820 may include a beam selection component 825, a beam refinement component 830, a beam switch trigger component 835, a communication component 840, a beam mapping component 845, a beam switch component 850, a trigger determination component 855, or any combination thereof. Each of these components may communicate, directly or indirectly, with one another (e.g., via one or more buses).

The communications manager 820 may support wireless communication at a first device in accordance with examples as disclosed herein. The beam selection component 825 may be configured as or otherwise support a means for selecting a first beam and a second beam from a set of multiple beams for communicating with a second device. The beam refinement component 830 may be configured as or otherwise support a means for performing a beam refinement procedure of the first beam to generate a first multicast autonomous beam refinement tree. The beam switch trigger component 835 may be configured as or otherwise support a means for determining a trigger for performing the beam refinement procedure of the second beam. In some examples, the beam refinement component 830 may be configured as or otherwise support a means for performing the beam refinement procedure of the second beam to generate a second multicast autonomous beam refinement tree in response to determining the trigger. The communication component 840 may be configured as or otherwise support a means for communicating with the second device based on performing the beam refinement procedure of the second beam.

In some examples, to support selecting a first beam and a second beam, the beam selection component 825 may be configured as or otherwise support a means for selecting the first beam based on a first beam metric. In some examples, to support selecting a first beam and a second beam, the beam selection component 825 may be configured as or otherwise support a means for selecting the second beam based on a second beam metric.

In some examples, to support performing the beam refinement procedure of the second beam, the beam mapping component 845 may be configured as or otherwise support a means for generating a beam mapping associated with the second beam based on the second multicast autonomous beam refinement tree. In some examples, to support performing the beam refinement procedure of the second beam, the beam selection component 825 may be configured as or otherwise support a means for selecting a third beam based on the beam mapping associated with the second beam. In some examples, to support performing the beam refinement procedure of the second beam, the communication component 840 may be configured as or otherwise support a means for communicating with the second device using the third beam.

In some examples, the beam mapping includes a mapping of a first set of multiple beams associated with the second beam to a first level of a set of multiple levels and a mapping of a second set of multiple beams associated with the second beam to a second level of the set of multiple levels.

In some examples, the beam selection component 825 may be configured as or otherwise support a means for selecting a beam from the first set of multiple beams and the second set of multiple beams based on a beam metric. In some examples, to support selecting the third beam, the beam selection component 825 may be configured as or otherwise support a means for selecting the third beam from a subset of beams corresponding to a level of a set of multiple levels.

In some examples, the beam switch trigger component 835 may be configured as or otherwise support a means for determining a trigger for performing a beam switch procedure. In some examples, the beam switch component 850 may be configured as or otherwise support a means for performing the beam switch procedure to select the first beam in response to determining the trigger for performing the beam switch procedure, where the first beam is selected based on the first beam satisfying a hysteresis threshold. In some examples, the first beam and the second beam include pseudo-omnidirectional beams or narrow beams, such as L2 beams, or a combination thereof.

In some examples, to support determining the trigger for performing the beam refinement procedure, the trigger determination component 855 may be configured as or otherwise support a means for determining a blockage of the first beam at the first device, where the blockage is associated with a degradation of a wireless communication performance of the first beam at the first device.

In some examples, the first device includes a UE, the first beam is located on a first wireless panel at the UE, and the second beam is located on a second wireless panel at the UE. In some examples, the first device includes a CPE, the first beam is located on a first wireless panel at the CPE, and the second beam is located on a second wireless panel at the CPE. In some examples, the first device is a customer premise equipment (CPE), and the first beam and the second beam are associated with a same panel at the CPE.

Figure 9:
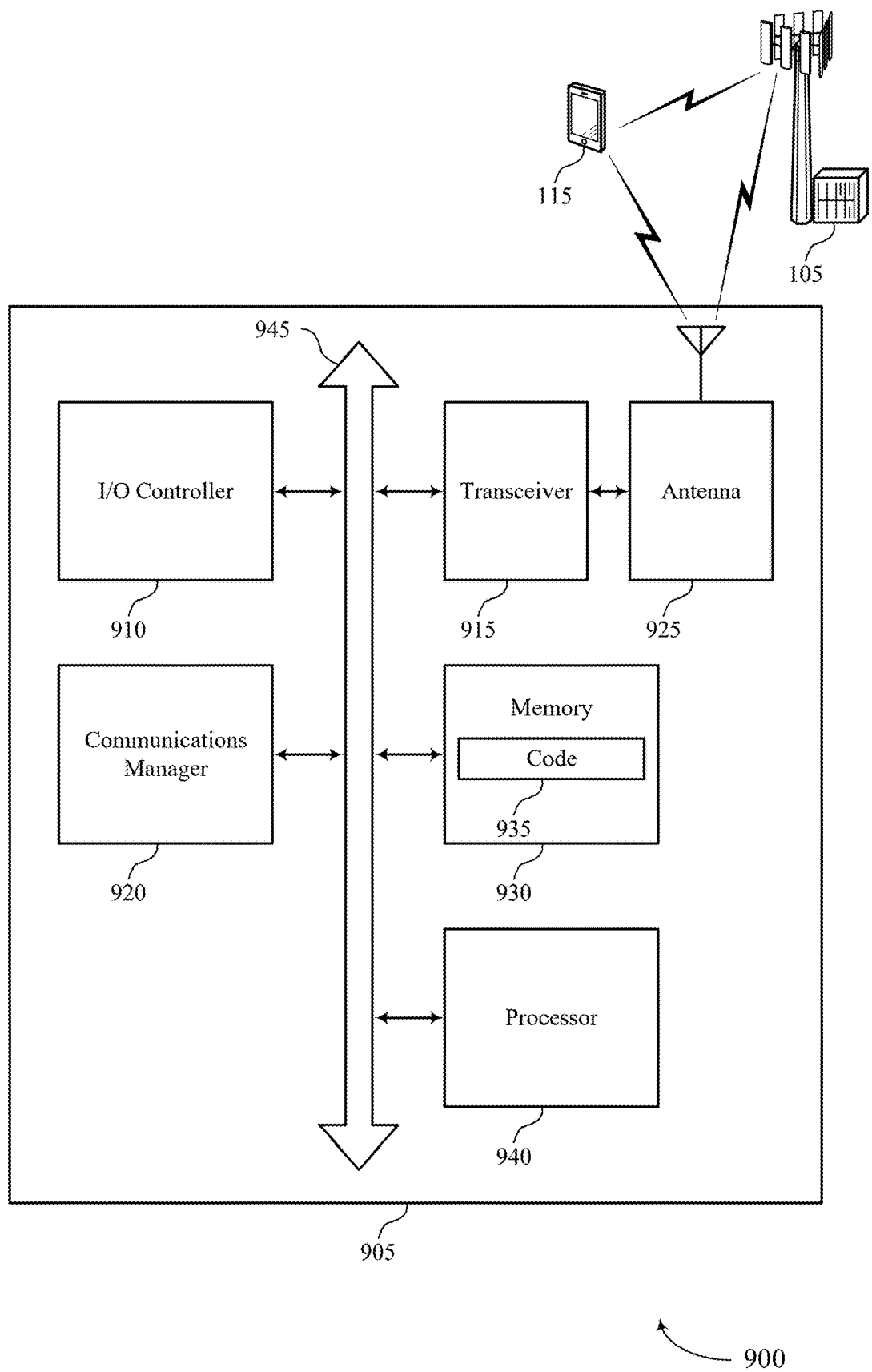
FIG. 9 shows a diagram of a system including a device that supports techniques for beam refinement and beam selection enhancement in accordance with one or more aspects of the present disclosure.

FIG. 9 shows a diagram of a system 900 including a device 905 that supports techniques for beam refinement and beam selection enhancement in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for beam refinement and beam selection enhancement). For example, the device 905 or a component of the device 905 may include a processor 940 and memory 930 coupled with or to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for selecting a first beam and a second beam from a set of multiple beams for communicating with a second device. The communications manager 920 may be configured as or otherwise support a means for performing a beam refinement procedure of the first beam to generate a first multicast autonomous beam refinement tree. The communications manager 920 may be configured as or otherwise support a means for determining a trigger for performing the beam refinement procedure of the second beam. The communications manager 920 may be configured as or otherwise support a means for performing the beam refinement procedure of the second beam to generate a second multicast autonomous beam refinement tree in response to determining the trigger. The communications manager 920 may be configured as or otherwise support a means for communicating with the second device based on performing the beam refinement procedure of the second beam.

By including or configuring the communications manager 920 in accordance with examples as described herein, the device 905 may support techniques for improved communication reliability, reduced latency, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for beam refinement and beam selection enhancement as described herein, or the processor 940 and the memory 930 may be otherwise configured to perform or support such operations.

Figure 10:
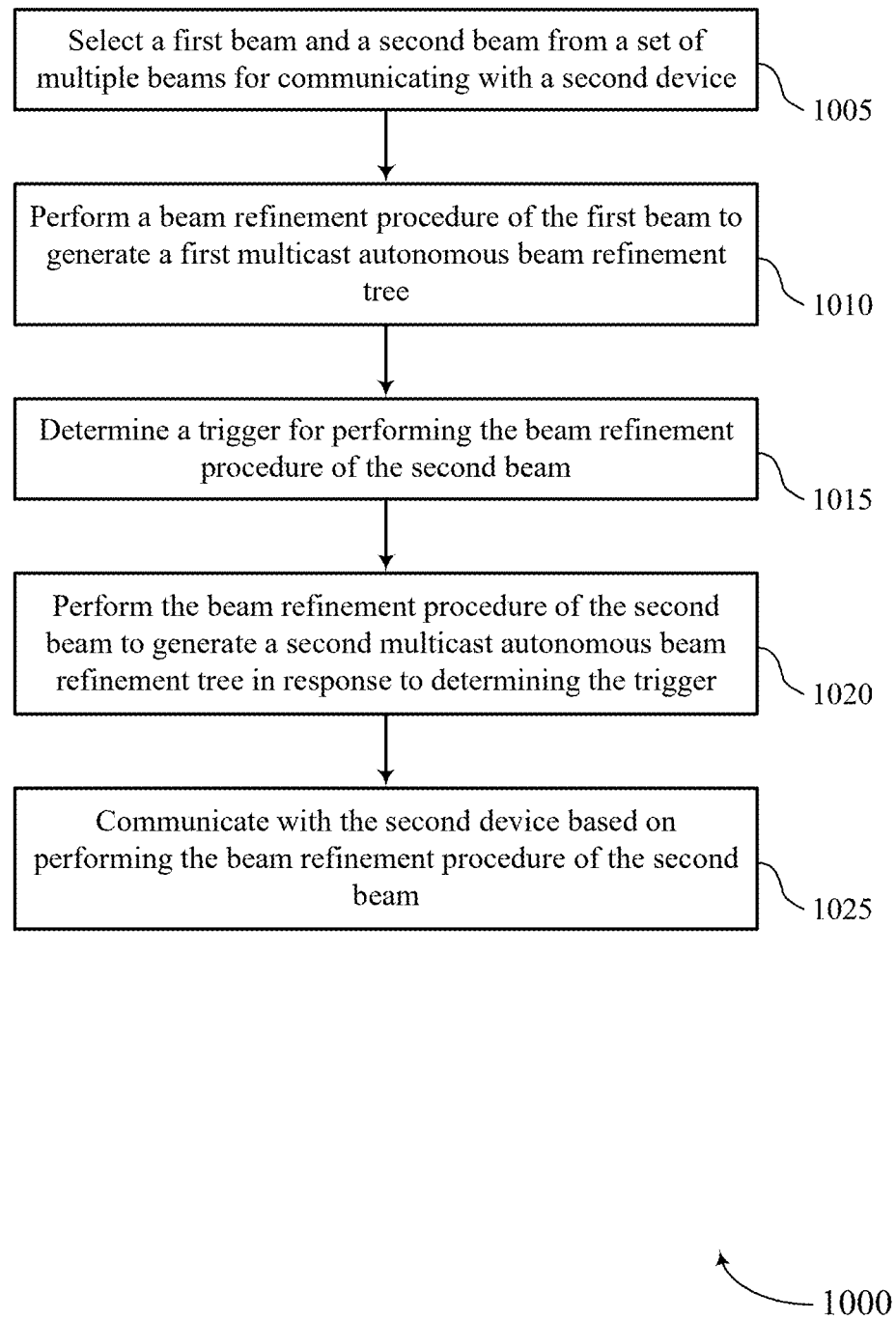
FIGS. 10 and 11 show flowcharts illustrating methods that support techniques for beam refinement and beam selection enhancement in accordance with one or more aspects of the present disclosure.

FIG. 10 shows a flowchart illustrating a method 1000 that supports techniques for beam refinement and beam selection enhancement in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include selecting a first beam and a second beam from a set of multiple beams for communicating with a second device. The operations of 1005 may be performed in accordance with examples as disclosed herein. In some examples, aspects of the operations of 1005 may be performed by a beam selection component 825 as described with reference to FIG. 8.

At 1010, the method may include performing a beam refinement procedure of the first beam to generate a first multicast autonomous beam refinement tree. The operations of 1010 may be performed in accordance with examples as disclosed herein. In some examples, aspects of the operations of 1010 may be performed by a beam refinement component 830 as described with reference to FIG. 8.

At 1015, the method may include determining a trigger for performing the beam refinement procedure of the second beam. The operations of 1015 may be performed in accordance with examples as disclosed herein. In some examples, aspects of the operations of 1015 may be performed by a beam switch trigger component 835 as described with reference to FIG. 8.

At 1020, the method may include performing the beam refinement procedure of the second beam to generate a second multicast autonomous beam refinement tree in response to determining the trigger. The operations of 1020 may be performed in accordance with examples as disclosed herein. In some examples, aspects of the operations of 1020 may be performed by a beam refinement component 830 as described with reference to FIG. 8.

At 1025, the method may include communicating with the second device based on performing the beam refinement procedure of the second beam. The operations of 1025 may be performed in accordance with examples as disclosed herein. In some examples, aspects of the operations of 1025 may be performed by a communication component 840 as described with reference to FIG. 8.

Figure 11:
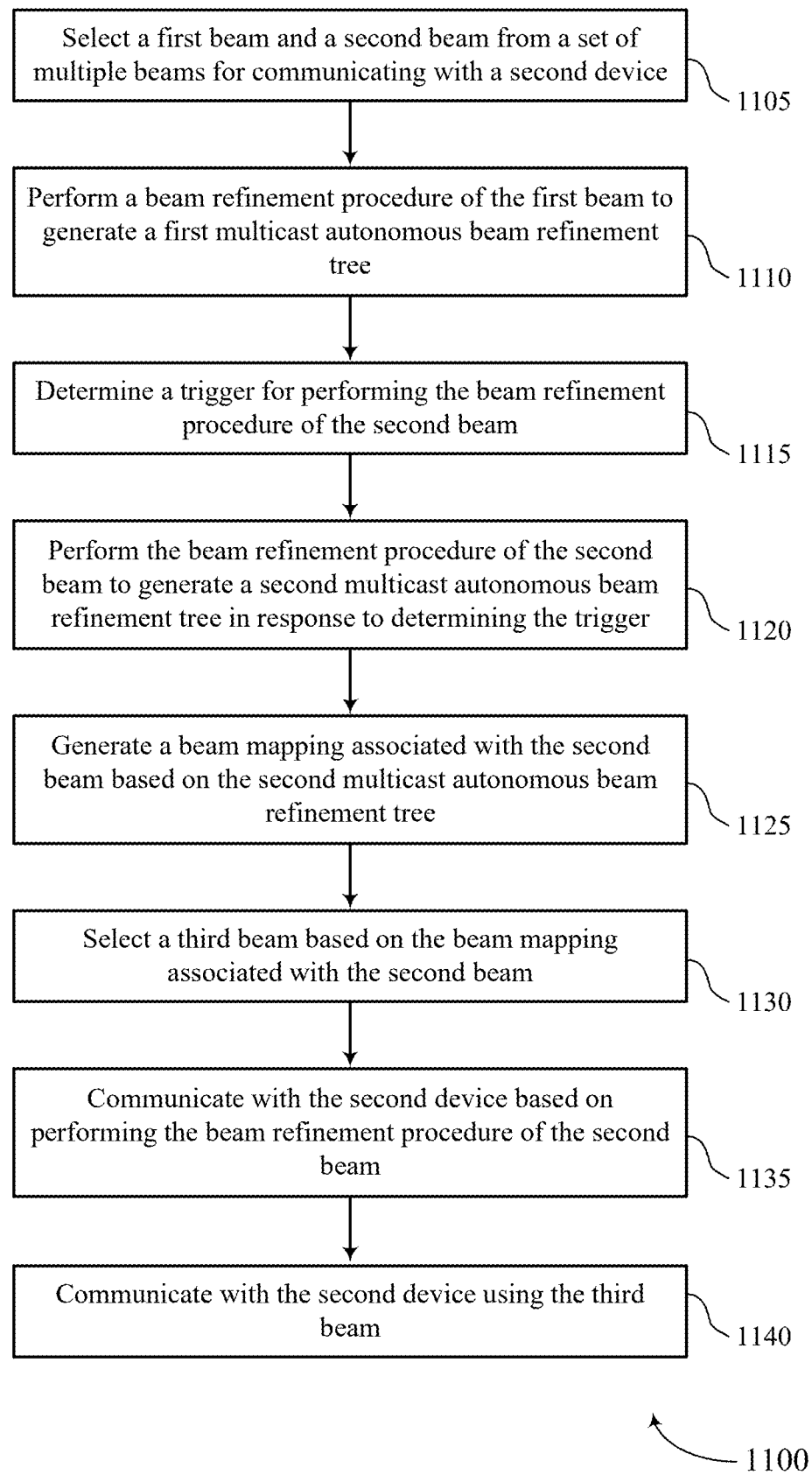

FIG. 11 shows a flowchart illustrating a method 1100 that supports techniques for beam refinement and beam selection enhancement in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include selecting a first beam and a second beam from a set of multiple beams for communicating with a second device. The operations of 1105 may be performed in accordance with examples as disclosed herein. In some examples, aspects of the operations of 1105 may be performed by a beam selection component 825 as described with reference to FIG. 8.

At 1110, the method may include performing a beam refinement procedure of the first beam to generate a first multicast autonomous beam refinement tree. The operations of 1110 may be performed in accordance with examples as disclosed herein. In some examples, aspects of the operations of 1110 may be performed by a beam refinement component 830 as described with reference to FIG. 8.

At 1115, the method may include determining a trigger for performing the beam refinement procedure of the second beam. The operations of 1115 may be performed in accordance with examples as disclosed herein. In some examples, aspects of the operations of 1115 may be performed by a beam switch trigger component 835 as described with reference to FIG. 8.

At 1120, the method may include performing the beam refinement procedure of the second beam to generate a second multicast autonomous beam refinement tree in response to determining the trigger. The operations of 1120 may be performed in accordance with examples as disclosed herein. In some examples, aspects of the operations of 1120 may be performed by a beam refinement component 830 as described with reference to FIG. 8.

At 1125, the method may include generating a beam mapping associated with the second beam based on the second multicast autonomous beam refinement tree. The operations of 1125 may be performed in accordance with examples as disclosed herein. In some examples, aspects of the operations of 1125 may be performed by a beam mapping component 845 as described with reference to FIG. 8.

At 1130, the method may include selecting a third beam based on the beam mapping associated with the second beam. The operations of 1130 may be performed in accordance with examples as disclosed herein. In some examples, aspects of the operations of 1130 may be performed by a beam selection component 825 as described with reference to FIG. 8.

At 1135, the method may include communicating with the second device based on performing the beam refinement procedure of the second beam. The operations of 1135 may be performed in accordance with examples as disclosed herein. In some examples, aspects of the operations of 1135 may be performed by a communication component 840 as described with reference to FIG. 8.

At 1140, the method may include communicating with the second device using the third beam. The operations of 1140 may be performed in accordance with examples as disclosed herein. In some examples, aspects of the operations of 1140 may be performed by a communication component 840 as described with reference to FIG. 8.

The following provides an overview of aspects of the present disclosure:

Aspect 1: A method for wireless communication at a first device, comprising: selecting a first beam and a second beam from a plurality of beams for communicating with a second device; performing a beam refinement procedure of the first beam to generate a first multicast autonomous beam refinement tree; determining a trigger for performing the beam refinement procedure of the second beam; performing the beam refinement procedure of the second beam to generate a second multicast autonomous beam refinement tree in response to determining the trigger; and communicating with the second device based at least in part on performing the beam refinement procedure of the second beam.

Aspect 2: The method of aspect 1, wherein selecting a first beam and a second beam further comprises: selecting the first beam based at least in part on a first beam metric; and selecting the second beam based at least in part on a second beam metric.

Aspect 3: The method of any of aspects 1 through 2, wherein performing the beam refinement procedure of the second beam further comprises: generating a beam mapping associated with the second beam based at least in part on the second multicast autonomous beam refinement tree; selecting a third beam based at least in part on the beam mapping associated with the second beam; and communicating with the second device using the third beam.

Aspect 4: The method of aspect 3, wherein the beam mapping comprises a mapping of a first plurality of beams associated with the second beam to a first level of a plurality of levels and a mapping of a second plurality of beams associated with the second beam to a second level of the plurality of levels.

Aspect 5: The method of aspect 4, further comprising: selecting a beam from the first plurality of beams and the second plurality of beams based at least in part on a beam metric.

Aspect 6: The method of any of aspects 3 through 5, wherein selecting the third beam further comprises: selecting the third beam from a subset of beams corresponding to a level of a plurality of levels.

Aspect 7: The method of any of aspects 1 through 6, further comprising: determining a trigger for performing a beam switch procedure; and performing the beam switch procedure to select the first beam in response to determining the trigger for performing the beam switch procedure, wherein the first beam is selected based at least in part on the first beam satisfying a hysteresis threshold.

Aspect 8: The method of any of aspects 1 through 7, wherein the first beam and the second beam comprise pseudo-omnidirectional beams or narrow beams or a combination thereof.

Aspect 9: The method of any of aspects 1 through 8, wherein determining the trigger for performing the beam refinement procedure further comprises: determining a blockage of the first beam at the first device, wherein the blockage is associated with a degradation of a wireless communication performance of the first beam at the first device.

Aspect 10: The method of any of aspects 1 through 9, wherein the first device comprises a UE, the first beam is located on a first wireless panel at the UE, and the second beam is located on a second wireless panel at the UE.

Aspect 11: The method of any of aspects 1 through 10, wherein the first device comprises a customer premise equipment (CPE), the first beam is located on a first wireless panel at the CPE, and the second beam is located on a second wireless panel at the CPE.

Aspect 12: The method of any of aspects 1 through 11, wherein the first device is a customer premise equipment (CPE), and the first beam and the second beam are associated with a same panel at the CPE.

Aspect 13: An apparatus for wireless communication at a first device, comprising a processor; memory coupled with the processor; and instructions stored in the memory and executable by the processor to cause the apparatus to perform a method of any of aspects 1 through 12.

Aspect 14: An apparatus for wireless communication at a first device, comprising at least one means for performing a method of any of aspects 1 through 12.

Aspect 15: A non-transitory computer-readable medium storing code for wireless communication at a first device, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   selecting, based at least in part on one or more beam metrics, a first beam and a second beam from a plurality of beams for communicating with a second device;
   performing a beam refinement procedure of the first beam to generate a first multicast autonomous beam refinement tree;
   communicating, after selecting the first beam and the second beam, with the second device via a first child beam of the first beam based at least in part on the first multicast autonomous beam refinement tree;
   determining, after selecting the first beam and the second beam and after communicating via the first child beam, a trigger for performing the beam refinement procedure of the second beam;
   performing the beam refinement procedure of the second beam to generate a second multicast autonomous beam refinement tree in response to determining the trigger; and
   communicating with the second device via a second child beam of the second beam based at least in part on performing the beam refinement procedure of the second beam.

2. The method of claim 1, wherein selecting the first beam and the second beam further comprises:
   selecting the first beam based at least in part on a first beam metric; and
   selecting the second beam based at least in part on a second beam metric.

3. The method of claim 1, wherein performing the beam refinement procedure of the second beam further comprises:
   generating a beam mapping associated with the second beam based at least in part on the second multicast autonomous beam refinement tree;
   selecting a third beam based at least in part on the beam mapping associated with the second beam, wherein the third beam is the second child beam; and
   communicating with the second device using the third beam.

4. The method of claim 3, wherein the beam mapping comprises a mapping of a first plurality of beams associated with the second beam to a first level of a plurality of levels and a mapping of a second plurality of beams associated with the second beam to a second level of the plurality of levels.

5. The method of claim 4, further comprising:
selecting a beam from the first plurality of beams and the second plurality of beams based at least in part on a beam metric.

6. The method of claim 3, wherein selecting the third beam further comprises:
selecting the third beam from a subset of beams corresponding to a level of a plurality of levels.

7. The method of claim 1, further comprising:
determining a second trigger for performing a beam switch procedure; and
performing the beam switch procedure to select the first beam in response to determining the second trigger for performing the beam switch procedure, wherein the first beam is selected based at least in part on the first beam satisfying a hysteresis threshold.

8. The method of claim 1, wherein the first beam and the second beam comprise pseudo-omnidirectional beams or narrow beams or a combination thereof.

9. The method of claim 1, wherein determining the trigger for performing the beam refinement procedure further comprises:
determining a blockage of the first beam at the first device, wherein the blockage is associated with a degradation of a wireless communication performance of the first beam at the first device.

10. The method of claim 1, wherein the first device comprises a user equipment (UE), the first beam is located on a first wireless panel at the UE, and the second beam is located on a second wireless panel at the UE.

11. The method of claim 1, wherein the first device comprises a customer premise equipment (CPE), the first beam is located on a first wireless panel at the CPE, and the second beam is located on a second wireless panel at the CPE.

12. The method of claim 1, wherein the first device is a customer premise equipment (CPE), and the first beam and the second beam are associated with a same panel at the CPE.

13. An apparatus for wireless communication at a first device, comprising:
one or more processors;
memory coupled with the one or more processors; and
instructions stored in the memory and executable by the one or more processors to cause the apparatus to:
select, based at least in part on one or more beam metrics, a first beam and a second beam from a plurality of beams for communicating with a second device;
perform a beam refinement procedure of the first beam to generate a first multicast autonomous beam refinement tree;
communicate, after selection of the first beam and the second beam, with the second device via a first child beam of the first beam based at least in part on the first multicast autonomous beam refinement tree;
determine, after the selection of the first beam and the second beam and after communication via the first child beam, a trigger for performing the beam refinement procedure of the second beam;
perform the beam refinement procedure of the second beam to generate a second multicast autonomous beam refinement tree in response to determining the trigger; and
communicate with the second device via a second child beam of the second beam based at least in part on performing the beam refinement procedure of the second beam.

14. The apparatus of claim 13, wherein the instructions to select the first beam and the second beam are further executable by the one or more processors to cause the apparatus to:
select the first beam based at least in part on a first beam metric; and
select the second beam based at least in part on a second beam metric.

15. The apparatus of claim 13, wherein the instructions to perform the beam refinement procedure of the second beam are further executable by the one or more processors to cause the apparatus to:
generate a beam mapping associated with the second beam based at least in part on the second multicast autonomous beam refinement tree;
select a third beam based at least in part on the beam mapping associated with the second beam, wherein the third beam is the second child beam; and
communicate with the second device using the third beam.

16. The apparatus of claim 15, wherein the beam mapping comprises a mapping of a first plurality of beams associated with the second beam to a first level of a plurality of levels and a mapping of a second plurality of beams associated with the second beam to a second level of the plurality of levels.

17. The apparatus of claim 16, wherein the instructions are further executable by the one or more processors to cause the apparatus to:
select a beam from the first plurality of beams and the second plurality of beams based at least in part on a beam metric.

18. The apparatus of claim 15, wherein the instructions to select the third beam are further executable by the one or more processors to cause the apparatus to:
select the third beam from a subset of beams corresponding to a level of a plurality of levels.

19. The apparatus of claim 13, wherein the instructions are further executable by the one or more processors to cause the apparatus to:
determine a second trigger for performing a beam switch procedure; and
perform the beam switch procedure to select the first beam in response to determining the second trigger for performing the beam switch procedure, wherein the first beam is selected based at least in part on the first beam satisfying a hysteresis threshold.

20. The apparatus of claim 13, wherein:
the first beam and the second beam comprise pseudo-omnidirectional beams or narrow beams or a combination thereof.

21. The apparatus of claim 13, wherein the instructions to determine the trigger for performing the beam refinement procedure are further executable by the one or more processors to cause the apparatus to:
determine a blockage of the first beam at the first device, wherein the blockage is associated with a degradation of a wireless communication performance of the first beam at the first device.

22. The apparatus of claim 13, wherein the first device comprises a user equipment (UE), the first beam is located on a first wireless panel at the UE, and the second beam is located on a second wireless panel at the UE.

23. The apparatus of claim 13, wherein the first device comprises a customer premise equipment (CPE), the first beam is located on a first wireless panel at the CPE, and the second beam is located on a second wireless panel at the CPE.

24. The apparatus of claim 13, wherein the first device is a customer premise equipment (CPE), and the first beam and the second beam are associated with a same panel at the CPE.

25. An apparatus for wireless communication at a first device, comprising:
- means for selecting, based at least in part on one or more beam metrics, a first beam and a second beam from a plurality of beams for communicating with a second device;
- means for performing a beam refinement procedure of the first beam to generate a first multicast autonomous beam refinement tree;
- means for communicating, after selecting the first beam and the second beam, with the second device via a first child beam of the first beam based at least in part on the first multicast autonomous beam refinement tree;
- means for determining, after selecting the first beam and the second beam and after communicating via the first child beam, a trigger for performing the beam refinement procedure of the second beam;
- means for performing the beam refinement procedure of the second beam to generate a second multicast autonomous beam refinement tree in response to determining the trigger; and
- means for communicating with the second device via a second child beam of the second beam based at least in part on performing the beam refinement procedure of the second beam.

26. The apparatus of claim 25, wherein the means for selecting the first beam and the second beam further comprise:
- means for selecting the first beam based at least in part on a first beam metric; and
- means for selecting the second beam based at least in part on a second beam metric.

27. A non-transitory computer-readable medium storing code for wireless communication at a first device, the code comprising instructions executable by one or more processors to:
- select, based at least in part on one or more beam metrics, a first beam and a second beam from a plurality of beams for communicating with a second device;
- perform a beam refinement procedure of the first beam to generate a first multicast autonomous beam refinement tree;
- communicate, after selection of the first beam and the second beam, with the second device via a first child beam of the first beam based at least in part on the first multicast autonomous beam refinement tree;
- determine, after the selection of the first beam and the second beam and after communication via the first child beam, a trigger for performing the beam refinement procedure of the second beam;
- perform the beam refinement procedure of the second beam to generate a second multicast autonomous beam refinement tree in response to determining the trigger; and
- communicate with the second device via a second child beam of the second beam based at least in part on performing the beam refinement procedure of the second beam.

28. The non-transitory computer-readable medium of claim 27, wherein the instructions to select the first beam and the second beam are further executable by the one or more processors to:
- select the first beam based at least in part on a first beam metric; and
- select the second beam based at least in part on a second beam metric.

29. The non-transitory computer-readable medium of claim 27, wherein the instructions to perform the beam refinement procedure of the second beam are further executable by the one or more processors to:
- generate a beam mapping associated with the second beam based at least in part on the second multicast autonomous beam refinement tree;
- select a third beam based at least in part on the beam mapping associated with the second beam; and
- communicate with the second device using the third beam.

30. The method of claim 1, wherein the plurality of beams are at a same beam level.

* * * * *